Oct. 1, 1935. G. G. MORENO 2,015,722
REFLECTOR FOR CINEMATOGRAPHIC PURPOSES
Filed April 25, 1934

Inventor
Gabriel Garcia Moreno
By Lyon&Lyon
Attorneys

Patented Oct. 1, 1935

2,015,722

UNITED STATES PATENT OFFICE 2,015,722

REFLECTOR FOR CINEMATOGRAPHIC PURPOSES

Gabriel Garcia Moreno, Los Angeles, Calif., assignor, by direct and mesne assignments, to C M C Corporation, New York, N. Y., a corporation of Delaware Application April 25, 1934, Serial No. 722,271

3 Claims. (Cl. 88—24)

This invention relates to an improved form of reflector particularly adapted for projection of two or more frames of motion picture film simultaneously.

During projection of motion picture film it is highly desirable that the entire picture area of the frame being projected be uniformly and intensely illuminated. In the projection of isomorphous images bearing records of different color value, as is the case in the projection of colored pictures by the additive method, it is difficult to illuminate both of the frames with sufficient intensity when the normal light source is employed.

This invention permits the use of a conventional reflector such as an arc or tungsten filament but contemplates a modification of the reflecting surface itself in such manner that the double gate employed is fully illuminated.

It has been discovered that when the usual concave reflector (either spherical or parabolic) is bisected by a plane passing through the axis of the reflecting surface, such plane preferably also passing through the line of demarcation between adjoining frames which it is desired to simultaneously project, then the two sectors thus formed may be pivoted on axes or axis parallel to such line of demarcation and permit a single light source, such as the arc or tungsten filament, to uniformly and intensely illuminate both frames of the picture being projected.

Figure 1:
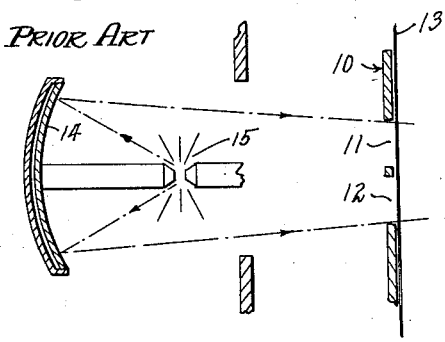

In order to fully describe the invention, reference will be had to the appended drawing, in which:

Fig. 1 diagrammatically represents a conventional reflector.

Figure 2:
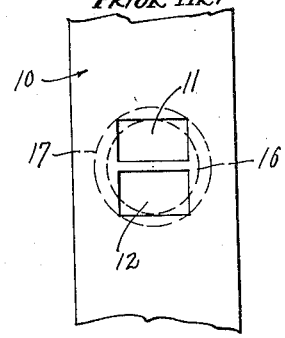

Fig. 2 represents the illumination obtainable with such reflector.

Figure 3:
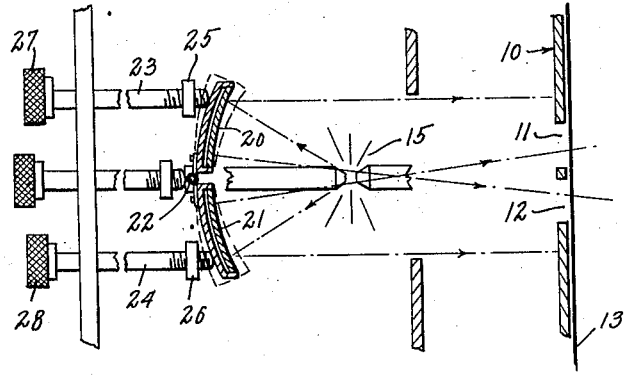

Fig. 3 diagrammatically represents one form which my improved form of reflector may assume.

Figure 4:
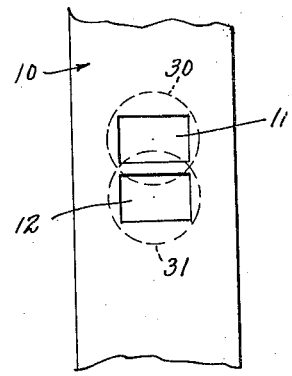

Fig. 4 represents the distribution of illumination obtainable by my improved reflector.

As shown in the drawing, the film gate, indicated at 10, contains two apertures 11 and 12 separated by a horizontal dividing member whereby two adjacent picture areas on the film 13 may be simultaneously illuminated and projected. A carbon arc reflector is used for purposes of illustration and may include a spherical reflector 14 suitably mounted in the rear of the arc 15 (or other light source). Means for moving the reflector 14 toward and away from the crater of the arc or for pivoting the reflector 14 so as to throw the beam directly against the gate, are customarily provided but such means are not shown in the drawing as they are well known in the art.

As shown in Fig. 2, the circle of light thrown by the reflector 14 is indicated by the dotted lines 16. As the conventional reflector is designed to intensely illuminate but a single frame or single aperture, the two gates 11 and 12 are not uniformly illuminated. If an attempt is made to enlarge the circle 16 by moving the reflector 14 closer to the arc or light source 15 so as to form the enlarged circle 17, the effective light intensity on the area of the film gates 11 and 12 is materially diminished and a large proportion of the light is wasted, being directed upon the gate itself and not upon the gate apertures.

In accordance with my invention, the spherical or parabolic reflecting surface 14 is split horizontally by a plane passing through the axis of the reflector so as to form concave reflecting sectors 20 and 21. These reflecting sectors may be hinged together as indicated at 22 and means for adjustably positioning the sectors relatively to each other may be provided such as the shafts 23 and 24 threaded through stationary supports 25 and 26 respectively, the ends of the shafts being revolvably connected to the sectors 20 and 21 respectively so that by operation of the thumb screws 27 and 28 carried by the outer ends of the shafts, the sectors 20 and 21 may be positioned relatively to one another.

In this manner, the conjugate points of the reflecting members 20 and 21 may be shifted relatively to one another in a vertical plane. As a result, the improved reflector may be caused to illuminate the two adjacent film gates 11 and 12 in the manner illustrated in Fig. 4, wherein the upper reflector 20 produces a ring of illumination, indicated at 30, whereas the lower reflector sector 21 produces the ring of illumination 31. The same light source 15 is thus caused to illuminate adjacent film gates much more uniformly and economically than is the case with a normal reflector.

I claim:

1. A reflector particularly adapted to the projection of two adjacent frames of motion picture film simultaneously, comprising a pair of complementary concave reflector surfaces pivoted on a horizontal axis whereby the focal points thereof may be caused to coincide or to be spaced vertically a desired distance.

2. A reflector particularly adapted to the projection of two adjacent frames of motion picture film simultaneously, comprising a pair of complementary concave reflector surfaces provided with adjacent diametrical edges, and means for pivoting said complementary reflector surfaces independently along axes parallel to said edges.

3. In a reflector system particularly adapted to the projection of a plurality of longitudinally disposed and adjacent frames of motion picture film simultaneously, comprising a single light source, a pair of complementary concave reflector surfaces provided with adjacent diametrical edges in operative relation to said light source, and means for pivoting said complementary reflector surfaces independently along axes parallel to said edges whereby the converging beams reflected by said reflector surfaces may be adjustably positioned vertically.

GABRIEL GARCIA MORENO.